Dec. 15, 1942.  K. L. LANNINGER  2,305,296
PIPE COUPLING
Filed Sept. 6, 1940
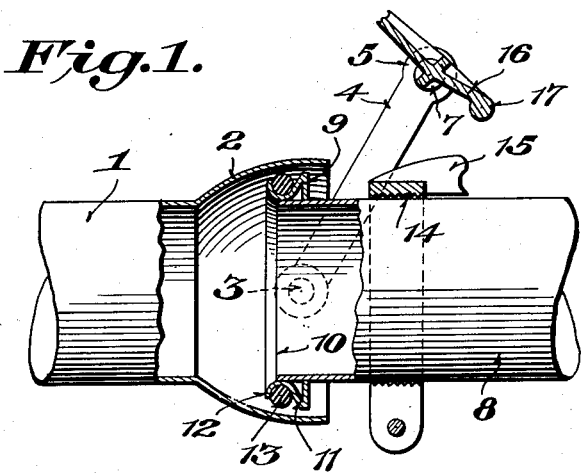
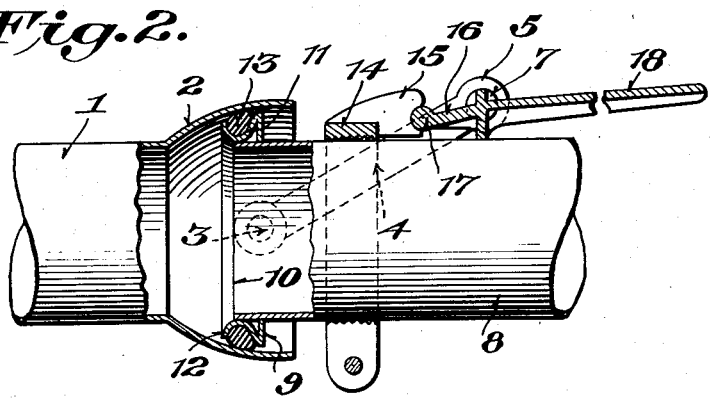
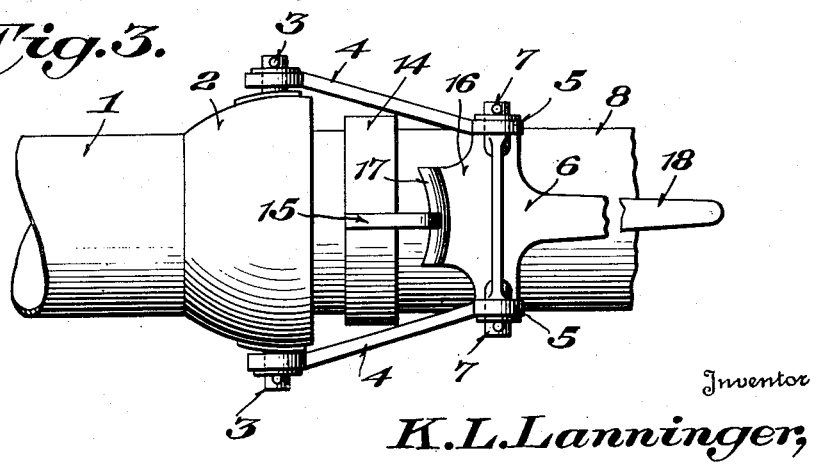
Inventor
K. L. Lanninger Patented Dec. 15, 1942

2,305,296

UNITED STATES PATENT OFFICE 2,305,296

PIPE COUPLING

Karl Ludwig Lanninger, Frankfort-on-the-Main, Germany; vested in the Alien Property Custodian Application September 6, 1940, Serial No. 355,680

1 Claim. (Cl. 285—93)

When constructing coupling and packing elements for pipe lines such as are laid only for a certain time by fire brigades or for sprinkling, care has to be taken that the coupling must be as simple as possible, so that it can be actuated by one hand and further permit of bringing the pipes into any desired angular position the one to the other in order to adapt the pipe conduit to the unevenness of the ground. With this object in view it has been proposed to place the packing ring on the end of the pipe which has to be inserted and to construct the coupling box at the end of the pipe destined to receive the insertable end as a cup which admits to adjust the inserted pipe at any desired angle. The coupling elements are held together by oscillatable bows which are arranged either on the insertable pipe end and cooperate with the ring turnable on the cup or hingedly mounted on the turnable ring and then coupled with the ring serving as abutment and fixed on the insertable pipe end. These constructions require, however, a special shape of the packing ring in order that the insertable pipe end can be inserted without jamming to produce a good packing. The employment of the turnable ball rings require additional expense for material.

The invention relates to a novel construction of such rapid pipe couplings to be bent at any desired angle, in which the end of the insertable pipe, which end carries the packing ring, can be inserted without jamming into a cup-shaped coupling box of the other pipe and held in this position by an oscillatable bow bridging over both pipe ends.

According to the invention the packing ring is mounted on a face which becomes larger towards the rear so that the ring cannot drop out, and the bridging bow, constructed as elbow lever, has an inwardly curved active face in the form of an arc of a circle, to which a barbed hook on the pipe to be inserted is coordinated. The oscillatable bow is preferably hinged on opposite pins fixed in the cup-shaped coupling box, whereas the barbed hook is mounted on a clamping ring of the insertable pipe end. The face on which the packing ring rolls is preferably constructed as an inwardly curved gutter-like disc, the arm of which extending forward from the insertable pipe end and partly engaging over the packing ring, the other arm being supported by a flange ring fixed on the pipe. The inner diameter of the packing ring is adapted to the smallest diameter of the surface on which the ring can roll. The insertable pipe end can then be inserted into the cup-shaped box at first freely until the packing ring is pressed against the same. When the elbow lever is then oscillated, the pipe is farther pushed into the coupling box, the packing ring rolling in backward direction on the surface and ensuring a good packing in any angular position of the pipes. The active face of the elbow lever engages securely behind the barbed hook in any angular position which can be assumed by the pipes owing to the cup-shaped coupling box and securely and tightly holds together the two pipes in any position.

This construction enables to employ simple packing rings of circular cross-section, so that it is no longer necessary to provide separate rings turnable on the cup-shaped coupling box for the bridging bow or for the barbed hook.

An embodiment of the invention is illustrated by way of example in the accompanying drawing, in which Figs. 1 and 2 show each a section through the coupling, Fig. 1 in the open position and Fig. 2 in the closed position, Fig. 3 is a top plan view of Fig. 2.

The end of the pipe 1 is formed by a cup-shaped coupling box 2 which has two opposite pins 3 on each of which an arm 4 is hingedly mounted. The front ends of the arms 4 terminate each in an eye 5 in which the ends 7 of a clamping lever 6 engage.

A ring holder 9 is fitted to the end 10 of the male member or pipe 8 of the coupling. This holder includes a portion 11 having a conical surface generated by a line disposed substantially at right angles to the chord of an arcuate gutter like portion 12 which receives the resilient packing ring 13 of circular cross-section.

A clamping ring 14 having an upwardly projecting nose 15 is mounted on pipe 8.

The clamping lever 6 destined to be inserted into the nose 15 has a large arm 16 with beaded end 17 the other arm 18 of said lever forming a handle.

For producing the pipe connection the end of pipe 8 is inserted by hand into the coupling box 2 until the packing ring 13 bears against the inner surface of this coupling box as shown in Fig. 2. The beaded end 17 of the clamping lever 6 is then placed under the nose 15 of clamping ring 14, whereupon the elbow lever is pressed down on to the pipe 8. The end 10 of the pipe 8 is thus further shifted into the coupling box 2 and the packing ring 13 rolls in the gutter towards the rear and is tightly clamped in the coupling box 2, as shown in Fig. 2. The beaded end of the clamping lever 6 slides under the nose 15 when the pipe 8 is moved at an angle relative to pipe 1.

The hinged arms 4 of the coupling box may be mounted on pins of the clamping ring 14 in which case the abutment nose 15 is fixed on the cup-shaped coupling box 2.

I claim:

In a quickly connectible and disconnectible pipe coupling, the combination with a coupling box on the female end of the coupling having an arcuate outwardly flaring inner surface, of means for mounting an annular resilient packing ring of circular cross-section on the male member of the coupling, said means comprising an annular ring holder carried by the front end of the said male member of the coupling and including a front portion of arcuate formation conforming substantially to the contour of the circular cross-section of the packing ring to provide a seat therefor, and a rearwardly extending substantially conical rolling surface generated by a line substantially at right angles to the chord of the arc on which the front portion is formed, said surface being of greater length than the diameter of the packing ring and terminating in a shoulder of larger diameter than the diameter of the leading edge of the said front portion, whereby, as the shoulder approaches the inner surface of the outwardly flaring coupling box, said surface and shoulder finally clamp the ring therebetween, and means for quickly connecting and disconnecting the male and female parts of the coupling.

KARL LUDWIG LANNINGER.